United States Patent
Larsson

(10) Patent No.: US 9,716,297 B2
(45) Date of Patent: Jul. 25, 2017

(54) ENERGY STORAGE MODULE AND SYSTEM

(71) Applicant: VOLVO CAR CORPORATION, Gothenburg (SE)

(72) Inventor: Johannes Larsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/867,310

(22) Filed: Sep. 28, 2015

(65) Prior Publication Data

US 2016/0099490 A1    Apr. 7, 2016

(30) Foreign Application Priority Data

Oct. 3, 2014  (EP) .................................... 14187620

(51) Int. Cl.
| | |
|---|---|
| *H01M 10/625* | (2014.01) |
| *H01M 10/6551* | (2014.01) |
| *H01M 2/10* | (2006.01) |
| *H01M 10/04* | (2006.01) |
| *H01M 10/647* | (2014.01) |

(Continued)

(52) U.S. Cl.
CPC ..... *H01M 10/6551* (2015.04); *B60L 11/1874* (2013.01); *B60L 11/1875* (2013.01); *B60L 11/1877* (2013.01); *B60L 11/1879* (2013.01); *H01M 2/1077* (2013.01); *H01M 10/0481* (2013.01); *H01M 10/613* (2015.04); *H01M 10/625* (2015.04); *H01M 10/647* (2015.04); *H01M 10/6555* (2015.04); *H01M 10/6557* (2015.04); *H01M 2220/20* (2013.01); *Y02T 10/7005* (2013.01)

(58) Field of Classification Search
CPC ........... H01M 2/1077; H01M 2220/20; H01M 10/0481; H01M 10/625; H01M 10/613; H01M 10/647; H01M 10/6555; H01M 10/6551; H01M 10/6557

See application file for complete search history.

(56) References Cited

U.S. PATENT DOCUMENTS

| | | | |
|---|---|---|---|
| 2012/0107659 A1 | 5/2012 | Phlegm et al. | |
| 2012/0156537 A1* | 6/2012 | Meintschel | ......... B60L 11/1874 429/99 |
| 2012/0301763 A1* | 11/2012 | Tonomura | ............... H01M 2/06 429/99 |

FOREIGN PATENT DOCUMENTS

JP    2011023266    2/2011

OTHER PUBLICATIONS

Extended European Search Report for European Applicaton No. EP 14187620.1, Completed by the European Patent Office, Dated Jan. 26, 2015, 6 Pages.

* cited by examiner

*Primary Examiner* — Brittany Raymond
(74) *Attorney, Agent, or Firm* — Brooks Kushman P.C.

(57) ABSTRACT

An energy storage module, an energy storage system including such modules, and a method for manufacturing an energy storage system are disclosed. The energy storage module may include an energy storage cell unit and a cooling plate unit which are kept in thermal contact with each other by a first retaining element having a through-hole and two deformed end portions. One of the end portions is deformed after the first retaining element has been arranged through the energy storage cell unit and the cooling plate unit. Two or more modules may be stacked together to form an energy storage system. The modules may be held together by a second retaining element arranged through the through-hole of the first retaining element.

14 Claims, 4 Drawing Sheets

(51) Int. Cl.
*H01M 10/6557* (2014.01)
*H01M 10/6555* (2014.01)
*H01M 10/613* (2014.01)
*B60L 11/18* (2006.01)

ENERGY STORAGE MODULE AND SYSTEM

CROSS-REFERENCE TO RELATED APPLICATIONS

This application claims foreign priority benefits under 35 U.S.C. §119(a)-(d) to European patent application number EP 14187620.1, filed Oct. 3, 2014, which is incorporated by reference in its entirety.

TECHNICAL FIELD

The present disclosure relates to an energy storage module, an energy storage system comprising such energy storage module, and to a corresponding manufacturing method.

BACKGROUND

Electric and hybrid vehicles have recently become a more common sight on roads worldwide. They have one thing in common and that is they all require a large and powerful rechargeable energy storage, e.g. a battery. In most such batteries, several battery cells are stacked together to form a battery powerful enough to provide energy for the vehicle to drive for example several tens of kilometers. The battery cells are in most cases mechanically fixed together with a common frame or enclosure to form a single unit which is conveniently mounted in the vehicle. Furthermore, the size of a battery providing sufficient power for driving an electric or hybrid energy is relatively large, whereby the battery cells tend to be closely packed in order to reduce the size of the battery.

However, the highly powerful batteries also produce high amounts of heat when in operation. Therefore, an appropriate cooling system is required for transporting heat away from the battery cells in order to prevent that the battery cells or other parts of the battery are damaged from overheating. The heat may for example be transported away from the battery cells by a liquid coolant passed through a cooling system in thermal contact with the battery cells. Alternatively or complimentary, cooling may be achieved by an air cooling system.

A battery typically comprises a number of stacked battery cells held together to form a unit. Typically, several modules comprising both battery cells and cooling systems are formed and subsequently mounted together. The mounting are not only meant for holding the modules or cells together but also to prevent swelling of the battery cells after successive operation.

One example of a battery is disclosed by US2012/0156537. The battery has battery cells stacked in parallel in a common direction. The stack of battery cells form a cell block and is held together by a tensioning device in the form of a screw with and a nut arranged through the stack. Several cell blocks are mechanically held together with bolts arranged through holes of tabs projecting from the cell blocks. However, such arrangement comprises relatively many parts and may further not obtain sufficient prevention of swelling of the battery cells at the same time as maintaining required cooling of the battery cells.

Therefore, it would be desirable to provide an energy storage device with more efficient assembly without compromising the performance of the energy storage.

SUMMARY

In view of the above, it is a general object of the present disclosure to provide an improved energy storage device which comprises fewer parts and is easier to assemble than what is known in prior art.

According to a first embodiment it is therefore provided an energy storage module comprising:

an energy storage cell unit;

a cooling plate unit stacked with the energy storage cell unit in a longitudinal direction, the cooling plate unit being in thermal contact with the energy storage cell unit; and an first elongated retaining element arranged through a through-hole of each of the energy storage cell unit and the cooling plate unit in the longitudinal direction, the first elongated retaining element having a through-hole in an elongation direction of the first elongated retaining element, the through-hole of the first elongated retaining element being adapted to receive a second retaining element, the first elongated retaining element comprising a first end portion having a dimension larger than a dimension of the through-hole of the energy storage cell unit or the cooling plate unit, wherein the first elongated retaining element comprises a deformed second end portion having a dimension larger than a dimension of the through-hole of the energy storage cell unit or said cooling plate unit, the first elongated retaining element being arranged to maintain a pressure on the energy storage module in the longitudinal direction such that the thermal contact is maintained.

In accordance with the disclosure the first elongated retaining element may be arranged to maintain sufficient thermal contact between the cooling plate unit and the energy storage cell unit. The energy storage cell unit may comprise an energy storage cell for storing energy to be provided as electrical energy. The through-holes which the first retaining element is arranged through are see-through holes of the cooling plate unit and the energy storage cell unit. Accordingly, the energy storage cell unit and the cooling plate unit may each comprise the through-hole in the longitudinal direction. The through-holes are naturally made through parts of the energy storage cell unit not necessarily through a part comprising the energy storage cell itself. Thus, the energy storage cell may be kept intact.

The cooling plate may comprise channels or ducts for transporting a cooling medium (e.g. a liquid such as water, or air) such that heat may be transported away from the energy storage cells.

Furthermore, the end portions of the first retaining element may be such that they are larger than a dimension of an adjacent portion of the first elongated retaining element.

The present disclosure is based on the realization that pre-tension of energy storage cells and assembly of several energy storage modules comprising such energy storage cells may be possible with reduced number of parts by allowing a retaining element, passing through the module comprising the energy storage cells, to have a through-hole. Furthermore, it is realized that the manufacturing of an energy storage system comprising several energy storage modules may thereby also be facilitated. For example, a second retaining element for fixating a plurality of modules with respect to each other may be arranged through the through-hole of the first retaining element. Thereby, the same through-hole of the energy storage cell unit and the cooling plate unit may be used with respect to pre-tension, thus for e.g. preventing swelling of the energy storage cell units, and with respect to fixating two modules with respect to each other. Thereby, fewer parts are needed for pretensioning and fixating of the modules. Furthermore, a more space-efficient (thus requiring less space) energy storage module is possible.

The first elongated retaining element may extend across the entire length of the energy storage module in the longitudinal direction. Furthermore, the through-hole of the first retaining element may extend in the longitudinal direction across the entire energy storage module.

According to an embodiment of the disclosure, the deformed end portion may has a dimension larger than a dimension of an opening of the through-hole of the energy storage cell unit or the cooling plate unit, such that the deformed end portion may be prevented from passing through the opening of the energy storage module. Thus, the first retaining element is prevented from passing through an opening of the through-hole such that at least a portion of the first retaining element protrudes outside the through-hole. Thereby, a simplified mounting of the energy storage module is possible. For example, the thermal contact between the cooling plate unit and the energy storage cell unit may be enabled by an easy access to the end portions of the first retaining element.

The first elongated retaining element may advantageously be tubular. Thereby, the end portions may more easily be deformed. Furthermore, a more symmetric deformation is possible allowing for a wide range of differently formed second retaining elements.

According to a second embodiment of the present disclosure, there is provided an energy storage system comprising two energy storage modules according to the first embodiment, the energy storage modules being stacked in the longitudinal direction; and a second retaining element arranged through the through-hole of the first elongated retaining element of each of the two energy storage modules, the second retaining element being arranged to maintain a relative position of the energy storage modules in the longitudinal direction.

Thus, the second retaining element extends through the through-hole of the first retaining element in the longitudinal direction. Thus, the first and the second retaining elements may be coaxially arranged. Furthermore, the arrangement of the first and second retaining elements advantageously enables two already pre-tensioned (by the first retaining element) modules to be assembled and fixated with respect to each other using the second retaining element.

Note that the number of pre-tensioned energy storage modules may be more than two, for example 4-8 modules may be comprised in the energy storage system.

The energy storage system may advantageously be arranged as an energy storage system in a vehicle such as e.g. an electric or hybrid car or a truck.

The second retaining element may be arranged to extend from a first end to a second end of the stack of the energy storage modules in the longitudinal direction. Thus, the second retaining element extends across the entire length of the stack in the longitudinal direction.

According to an embodiment of the disclosure, an end plate may be arranged at a first end of the stack, wherein the second retaining element is arranged through a through-hole of the end plate, and wherein the second retaining element is arranged to apply a force to the energy storage modules via the end plate. Thereby, the force may be more evenly applied across the surface of the energy storage cell unit or the cooling plate unit. Furthermore, the end plate may provide physical protection for the energy storage modules.

There may advantageously further be a second end plate arranged at an end of the stack of energy storage modules opposite the first end plate with respect to the stack.

Furthermore, the second retaining element may advantageously be a pin-bolt.

Further effects and features of this second embodiment of the present disclosure are largely analogous to those described above in connection with the first embodiment of the disclosure.

According to a third embodiment of the present disclosure there is provided a method for manufacturing an energy storage system comprising an energy storage module comprising:

an energy storage cell unit;

a cooling plate unit stacked with the energy storage cell unit in a longitudinal direction, the cooling plate unit being in thermal contact with the energy storage cell unit;

wherein the method comprises the steps of:

arranging a first elongated retaining element through a through-hole of each of the energy storage cell unit and the cooling plate unit in the longitudinal direction, the first elongated retaining element comprising a first end portion having a dimension larger than a dimension of the through-hole of the energy storage cell unit or the cooling plate unit, the first elongated retaining element having a through-hole in an elongation direction of the first elongated retaining element, applying a force on the energy storage module in the longitudinal direction such that a contact between the energy storage cell unit and the cooling plate unit is maintained; and while the force is applied, deforming a second end portion of the first elongated retaining element such that a dimension of said second end portion is larger than a dimension of said through-hole of said energy storage cell unit or said cooling plate unit, wherein said contact between said energy storage cell unit and said cooling plate unit is maintained by said first and second end portions of said first elongated retaining element.

According to an embodiment of the disclosure, the force applied to the energy storage module may also be applied to the first elongated retaining element to deform the second end portion of the first elongated retaining element.

The deformation may be an enlargement of an outer circumference of the second end portion caused by the applied force, the circumference being in a cross-section in a plane perpendicular to the elongation direction of the first elongated retaining element.

According to an embodiment of the disclosure, the method may further comprise the steps of:

stacking two energy storage modules in the longitudinal direction; and arranging a second retaining element through the through-hole of the first elongated retaining element of each of the two energy storage modules, the second retaining element being arranged to apply a second force on the energy storage modules in the longitudinal direction to maintain a relative position of the energy storage modules.

According to an embodiment of the disclosure, the method may further comprise the steps of:

arranging an end plate at a first end of the stack, and arranging the second retaining element through a through-hole of the end plate, wherein the second retaining element is arranged to apply a force to the energy storage modules via the end plate.

Further effects and features of this third embodiment of the present disclosure are largely analogous to those described above in connection with the first embodiment and the second embodiment of the disclosure.

Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

These and other features of the present disclosure will now be described in more detail, with reference to the appended drawings showing a currently preferred embodiment of the disclosure, wherein:

FIG. 2b is a perspective view of the embodiment of FIG. 2a;

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following description, the present disclosure is mainly described with reference to an energy storage enclosure for an energy storage arranged in an electric vehicle in the form of a car. However, the disclosure may be applied to any type of electric vehicle such as a truck, a fork lift, a boat, etc.

Figures 1, 2A:
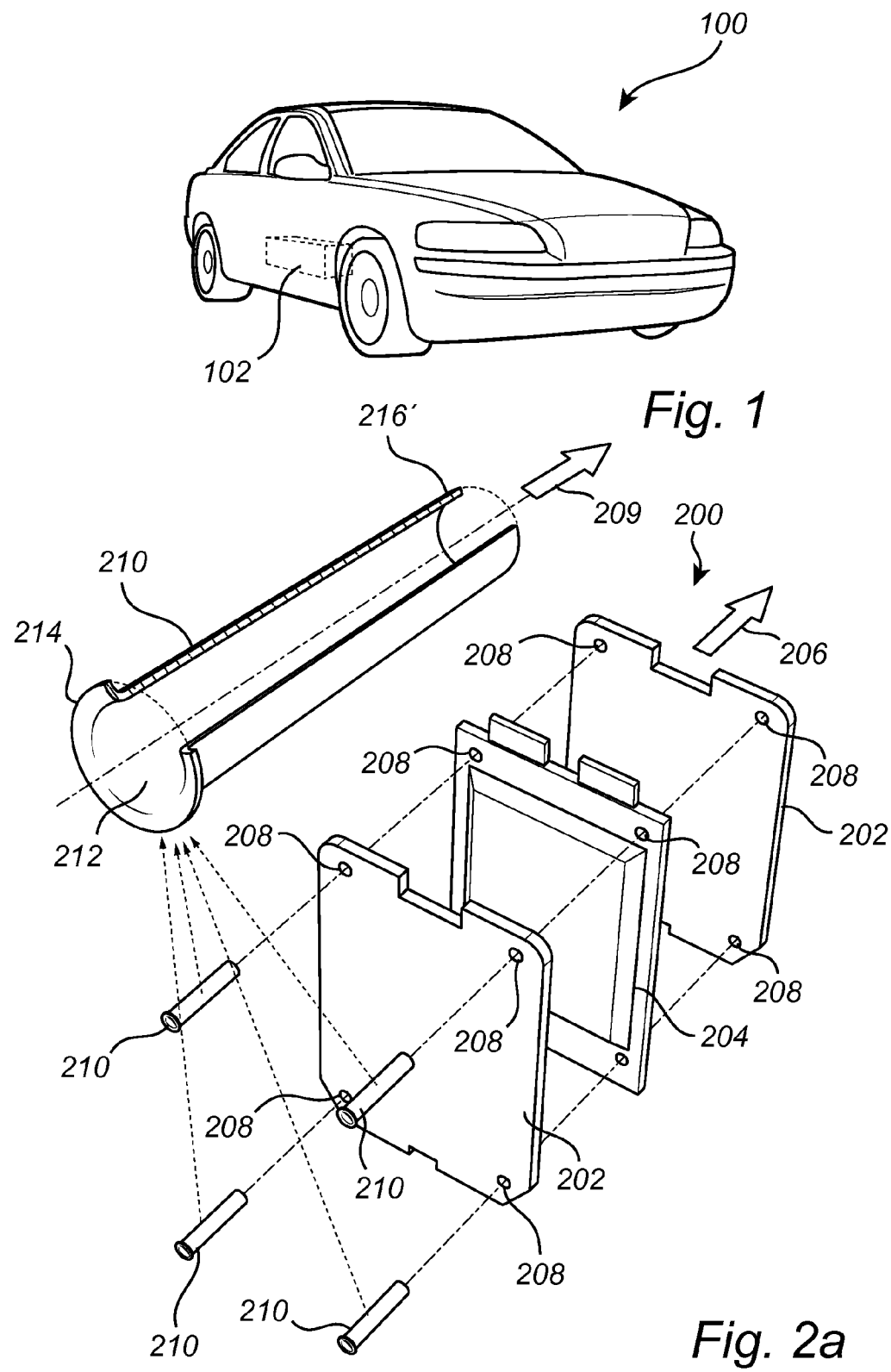
FIG. 1 illustrates an exemplary application for embodiments of the present disclosure.
FIG. 2a is an exploded view of exemplary embodiment of the disclosure.

FIG. 1 illustrates an electric vehicle 100 comprising an energy storage system 102. The energy storage system 102 is configured to provide power for operating the electric vehicle 100. The electric vehicle 100 is depicted as an electric car, however any other vehicle, such as e.g. a truck or a fork lift is suitable. The energy storage system 102 of this electric vehicle comprises an energy storage module according to an exemplary embodiment of the present disclosure.

FIG. 2a illustrates an exploded view of an energy storage module 200 according to an embodiment of the disclosure. The energy storage module 200 comprises an energy storage cell unit 204 (such as a battery) and a cooling plate unit 202 (in this particular example embodiment there are two cooling plate units, each numbered 202). The cooling plate unit 202 is stacked with the energy storage cell unit 204 in a longitudinal direction 206. The cooling plate unit 202 is kept in thermal contact with the energy storage cell unit 204 in order to transfer heat away from the energy storage cell unit 204. The energy storage cell unit 204 and the cooling plate unit 202 each have a through-hole 208 in the longitudinal direction 206. In this particular example embodiment, each of the cooling plate 202 and the energy storage cell unit 204 has four through-holes 208, one in each corner of the respective unit 202, 204. The energy storage module 200 further comprises a first elongated retaining element 210. In the depicted example embodiment, there is a retaining element 210 arranged through each of the through-holes 208. The first elongated retaining element 210 is arranged to maintain a pressure on the energy storage module 200 in the longitudinal direction 206 such that a good thermal contact is obtained between the cooling plate unit 202 and the energy storage cell unit 204. Furthermore, the first retaining element 210 ensures a sufficient pre-tension of the energy storage cell units to prevent swelling of the cells.

Furthermore, as is clearly seen in the enlarged view of the first retaining element 210, there is a through-hole 212 (e.g. a see-through hole) in the first elongated retaining element 210 along an elongation direction of the retaining element 210. The through-hole 212 of the first retaining element is adapted to receive a second retaining element as will be explained with reference to FIG. 3. Moreover, the first retaining element 210 may advantageously be tubular. Furthermore, the first elongated retaining element has an elongation direction 209 which may be parallel with the longitudinal direction 209.

Figure 2B:
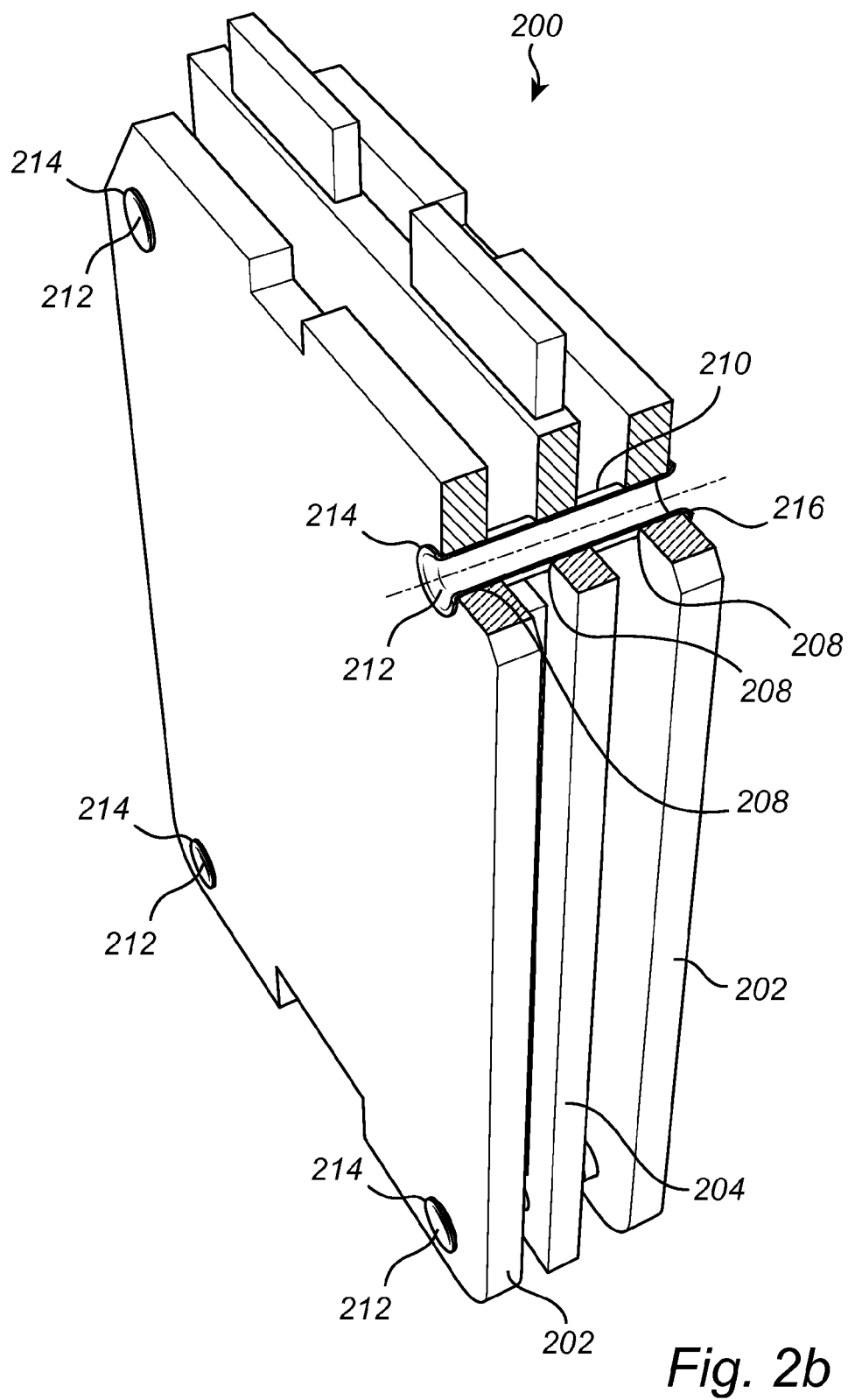

A first end portion 214 of the first elongated retaining element 210 has a larger dimension than a dimension of the through-hole 208 of at least one of the energy storage cell unit 204 or the cooling plate unit 202. In this particular example, the first elongated retaining element 210 has a dimension large than the through-hole 208 of the cooling plate unit 202. Thereby, the first end portion 214 of the first elongated retaining element 210 is prevented from passing through the through-hole 208 of the cooling plate unit 202. Furthermore, there is a second end portion 216' of the first retaining element 210. The second end portion 216' may be deformed by applying a pressure on the second end portion 216' to obtain e.g. an "upset" of a tubular first retaining element 210 (similar to the depicted first end portion 214), in order words, after the deformation, the second end portion 216 may have a dimension (e.g. a diameter) larger than a dimension (e.g. a diameter) of the opening of the through-holes 208. The deformation of the second end portion 216 may be such that a flange-type deformation is created along the circumference of the second end portion 216. The deformation of the second end portion 216 is schematically illustrated in FIG. 4b. An assembled energy storage module 200 is illustrated in FIG. 2b, showing for example the deformed second end portion 216, other reference numerals correspond to the reference numerals of FIG. 2a. Using a deformed end portion 216 of the retaining element additional parts for accomplishing the pre-tension of the energy storage cell unit 204 (thus, to prevent swelling) may be avoided. Thereby saving space between the energy storage cell unit 204 and the cooling plate unit 202. For example, nuts or bolts may be avoided for this purpose of the module 200.

In the above example embodiment shown in FIG. 2a-b, the energy storage cell unit 204 may be battery cells with the appropriate frame supporting the cell itself. Moreover, the first retaining element 210 with both end portions 214, 216' may be formed in one piece. Alternatively, the first retaining element 210 with the deformed second end portion 216' may be formed in one piece and the first end portion may be accomplished otherwise (e.g. with a nut). The cooling plate unit 202 may comprise ducts of channels for flowing a coolant such as a liquid or any other cooling medium.

Figure 3:
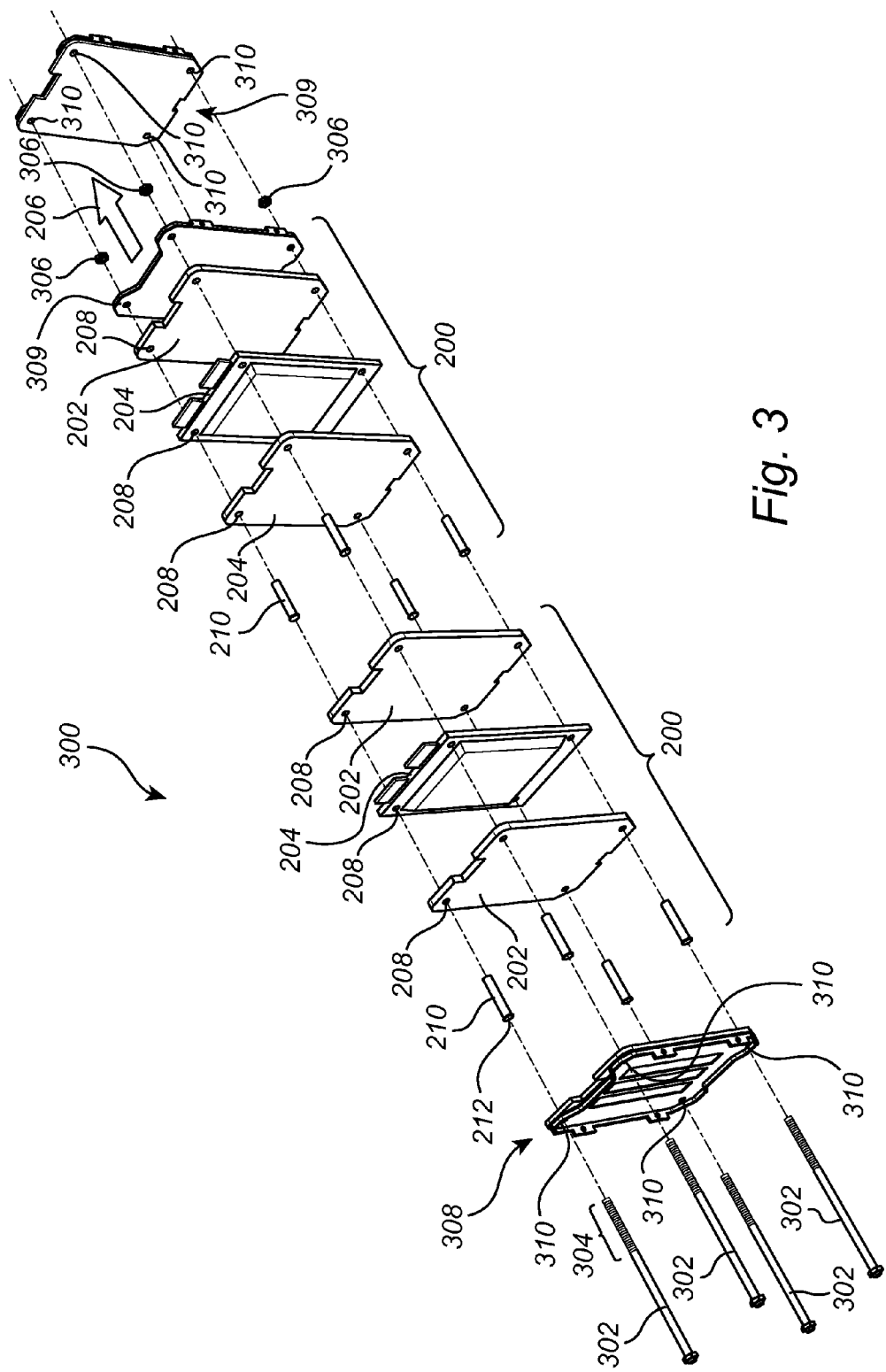
FIG. 3 is an exploded view of an exemplary embodiment of the disclosure.

FIG. 3 illustrates an exemplary energy storage system 300 according to an embodiment of the disclosure. The energy storage system 300 comprises two energy storage modules 200 as shown in FIG. 2b. Similar reference numerals refer to like elements in FIG. 3 compared to the reference numerals in FIG. 2a-b. In FIG. 3, the two energy storage modules 200 are stacked in the longitudinal direction 206. In order to maintain a relative position of the modules 200 with respect to each other, there is a second retaining element 302 arranged through the through-hole 212 of each first retaining element 210 of both energy storage modules 200. Of course, the second retaining element 302 is also arranged through the through-hole 208 of the energy storage cell unit 204 and the cooling plate unit 202.

In the exemplary energy storage system shown in FIG. 3, the second retaining element 302 is in the form of a pin-bolt with threads 304. The pin-bolt (thus second retaining element 302) extends from the first end to the second end of the stack of modules 200 in the longitudinal direction 206. The pin-bolt is tightened with a nut 306 in order to fix the relative position of the modules 200. Another example of a second retaining element 302 is a metal wire. Thus, the disclosure is not limited to the use of a pin-bolt as second retaining element 302.

Furthermore, there may be an end plate 308 arranged at an end of the stack of modules. The end plate 308 comprises through-holes 310 such that the second retaining element 302 may be inserted through the end plate. This way, the second retaining element may be arranged to apply a force to the energy storage modules 200 via the end plate for maintaining the relative positions of the modules 200. Furthermore, there may be a second end plate 309 arranged on the opposite side of the stack of modules 200 with respect to the location of the first end plate 308 in the longitudinal direction 206. The end plates 308, 309 facilitates maintaining a mechanically stable energy storage system 300. A shown in FIG. 3, the end plates 308, 309 are stacked with the modules 200. Note also that before the energy storage modules are assembled together, the second end portion 216 is deformed such that to form energy storage modules 200 as shown in FIG. 2b.

Figure 4A:
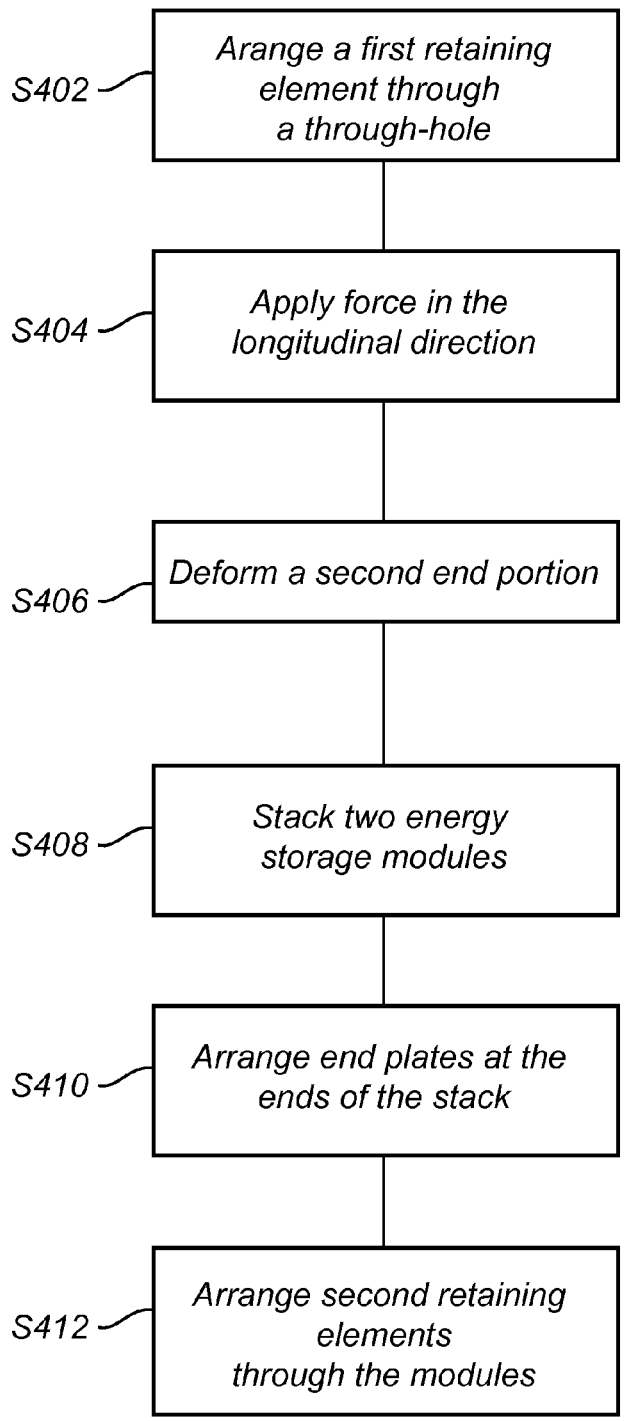
FIG. 4a is a flow-chart showing method steps according to an embodiment of the disclosure.
Figure 4B:
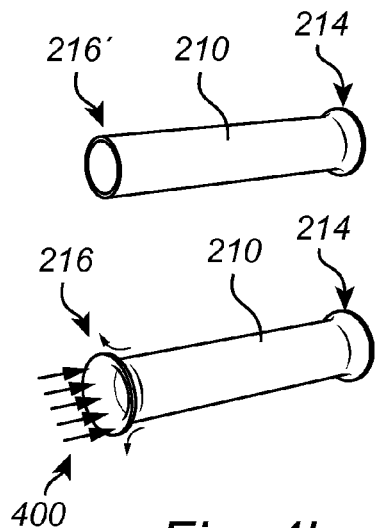
FIG. 4b schematically illustrates deforming an end portion of a first retaining element.

FIG. 4a-b illustrates method steps for manufacturing an exemplary energy storage system 300 according to an embodiment of the disclosure. Starting from an energy storage module 200 comprising at least one energy storage cell 204 units and at least one cooling plate unit 202 as shown in FIG. 2a-b, a first retaining element 210 is arranged S402 through a through-hole 208 of the energy storage cell unit 204 and the cooling plate unit 202. As shown in FIGS. 2a-b, the first retaining element 210 comprises a first end portion 214 being larger than the though-holes 208 as previously described. In a subsequent step S404, a force is applied on the energy storage module 200 in the longitudinal direction 206. This way, a contact between the energy storage cell unit 204 and the cooling plate unit 202 is maintained. Subsequently, in step S406, while the forced is applied, a second end portion 216' is deformed such that the second end portion is enlarged such that it may not pass through the though-hole 208 of the energy storage cell units 204 and/or the cooling plate unit 202. Thereby, the contact (thus the thermal contact) between the energy storage cell unit 204 and the cooling plate unit 202 is maintained by the first 214 and second 216 end portions of the first elongated retaining element 210. For example, as shown in FIG. 4b, the second end portion 216' may be deformed to a deformed second end portion 216 by applying a force 400 in the longitudinal direction of the first retaining element 210.

In some exemplary embodiments, the second end portion 216' is deformed in the same step, or at least by the same force applying means as in the step of applying the force to the module 200. In other words, as the thermal contact between the cooling plate unit and the energy storage cell unit is maintained by the applied force, the second end portion 216' is deformed in the same step.

Similar to what was described with reference to FIG. 2a-b, the deformation of the second end portion may be a deformation which causes an enlargement of an outer circumference of the second end portion, as shown in FIG. 4a. This type of deformation (an "upset" deformation) is advantageous because it saves space between the energy storage modules and it eliminates the need for nuts (i.e. fewer parts are needed) for holding the module together. Furthermore, the deformation may be in the form of a flange-type deformation around the end portion of the first retaining element.

In a further step S408, two energy storage modules 200 are stacked in the longitudinal direction 206. Optionally in a step S410, end plates 308, 309 are arranged on opposite ends of the stack in the longitudinal direction. Thus the end plates 308, 309 are also stacked with the modules 200. In a subsequent step S412, a second retaining element 302 is arranged in the through-holes 208 (and through-hole 310 if end plates 308, 309 are present). The second retaining element aligns the modules 200 (and optionally the end plates 308, 309) such that they maintain a relative position with respect to each other.

Additionally, variations to the disclosed embodiments can be understood and effected by the skilled person in practicing the disclosure, from a study of the drawings, the disclosure, and the appended claims. For example, the number of modules in an energy storage system may be more than two, for example, 4, 5, 6, 7, or 8, etc. Although depicted as a pin-bolt with nuts, the second retaining element may take other forms, for example the form of a wire. Furthermore, the number of cooling cell units 202 or the number of energy storage cell units 204 may be different from what is described herein. For example, the number of energy storage cell units may be 2, 3, 4, 5, or more, and the number of cooling plate units may likewise be higher than the depicted herein as long as the cooling effect of the energy storage cell unit is sufficient.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An energy storage module comprising:
    an energy storage cell unit;
    a cooling plate unit stacked with the energy storage cell unit in a longitudinal direction, the cooling plate unit being in thermal contact with the energy storage cell unit; and
    a first elongated retaining element arranged through a through-hole of each of the energy storage cell unit and the cooling plate unit in the longitudinal direction, the first elongated retaining element having a through-hole in an elongation direction of the first elongated retaining element, the through-hole of the first elongated retaining element being adapted to receive a second retaining element, the first elongated retaining element comprising a first end portion having a dimension larger than a dimension of the through-hole of the energy storage cell unit or the cooling plate unit;

wherein the first elongated retaining element comprises a deformed second end portion having a dimension larger than a dimension of the through-hole of the energy storage cell unit or the cooling plate unit, the first elongated retaining element being arranged to maintain a pressure on the energy storage module in the longitudinal direction such that the thermal contact is maintained.

2. The energy storage module according to claim 1 wherein the deformed end portion has a dimension larger than a dimension of an opening of the through-hole of the energy storage cell unit or the cooling plate unit, such that the deformed end portion is prevented from passing through the opening of the energy storage module.

3. The energy storage module according to claim 1 wherein the first elongated retaining element is tubular.

4. An energy storage system comprising:
a first energy storage module and a second energy storage module, wherein each energy storage module comprises
an energy storage cell unit,
a cooling plate unit stacked with the energy storage cell unit in a longitudinal direction, the cooling plate unit being in thermal contact with the energy storage cell unit, and
a first elongated retaining element arranged through a through-hole of each of the energy storage cell unit and the cooling plate unit in the longitudinal direction, the first elongated retaining element having a through-hole in an elongation direction of the first elongated retaining element, the through-hole of the first elongated retaining element being adapted to receive a second retaining element, the first elongated retaining element comprising a first end portion having a dimension larger than a dimension of the through-hole of the energy storage cell unit or the cooling plate unit,
wherein the first elongated retaining element comprises a deformed second end portion having a dimension larger than a dimension of the through-hole of the energy storage cell unit or the cooling plate unit, the first elongated retaining element being arranged to maintain a pressure on the energy storage module in the longitudinal direction such that the thermal contact is maintained, the energy storage modules being stacked in the longitudinal direction; and
a second retaining element arranged through the through-hole of the first elongated retaining element of each of the two energy storage modules, the second retaining element being arranged to maintain a relative position of the energy storage modules in the longitudinal direction.

5. The energy storage system according to claim 4 wherein the second retaining element is arranged to extend from a first end to a second end of the stack of the energy storage modules in the longitudinal direction.

6. The energy storage system according to claim 4 further comprising an end plate arranged at a first end of the stack, wherein the second retaining element is arranged through a through-hole of the end plate, and wherein the second retaining element is arranged to apply a force to the energy storage modules via the end plate.

7. The energy storage system according to claim 6 further comprising a second end plate arranged at an end of the stack of energy storage modules opposite the first end plate with respect to the stack.

8. The energy storage system according to claim 4 wherein the second retaining element is a pin-bolt.

9. A method for manufacturing an energy storage system comprising an energy storage module, which energy storage module comprises an energy storage cell unit and a cooling plate unit stacked with the energy storage cell unit in a longitudinal direction, the cooling plate unit being in thermal contact with the energy storage cell unit, the method comprising:
arranging a first elongated retaining element through a through-hole of each of the energy storage cell unit and the cooling plate unit in the longitudinal direction, the first elongated retaining element comprising a first end portion having a dimension larger than a dimension of the through-hole of the energy storage cell unit or the cooling plate unit, the first elongated retaining element having a through-hole in an elongation direction of the first elongated retaining element;
applying a force on the energy storage module in the longitudinal direction such that a contact between the energy storage cell unit and the cooling plate unit is maintained; and
while the force is applied, deforming a second end portion of the first elongated retaining element such that a dimension of the second end portion is enlarged and becomes larger than a dimension of the through-hole of the energy storage cell unit or the cooling plate unit, wherein the contact between the energy storage cell unit and the cooling plate unit is maintained by the first and second end portions of the first elongated retaining element.

10. The method according to claim 9 wherein the force applied to the energy storage module is also applied to the first elongated retaining element to deform the second end portion of the first elongated retaining element.

11. The method according to claim 10 wherein the deformation is an enlargement of an outer circumference of the second end portion caused by the applied force, the circumference being in a cross-section in a plane perpendicular to the elongation direction of the first elongated retaining element.

12. The method according to claim 9 further comprising:
stacking two energy storage modules in the longitudinal direction; and
arranging a second retaining element through the through-hole of the first elongated retaining element of each of the two energy storage modules, the second retaining element being arranged to apply a second force on the energy storage modules in the longitudinal direction to maintain a relative position of the energy storage modules.

13. The method according to claim 12 further comprising:
arranging an end plate at a first end of the stack; and
arranging the second retaining element through a through-hole of the end plate, wherein the second retaining element is arranged to apply a force to the energy storage modules via the end plate.

14. A vehicle comprising the energy storage system according to claim 4.

\* \* \* \* \*

UNITED STATES PATENT AND TRADEMARK OFFICE
CERTIFICATE OF CORRECTION

| | |
|---|---|
| PATENT NO. | : 9,716,297 B2 |
| APPLICATION NO. | : 14/867310 |
| DATED | : July 25, 2017 |
| INVENTOR(S) | : Johannes Larsson |

It is certified that error appears in the above-identified patent and that said Letters Patent is hereby corrected as shown below:

In the Drawings

Sheet 4 Fig 4a at text box S402:
Delete "Arange" and
Insert -- Arrange --.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*